Jan. 29, 1963    M. DE CAMILLIS ETAL    3,076,069
COMBINED SENSING AND SWITCHING DEVICE
Filed April 4, 1960    2 Sheets-Sheet 1
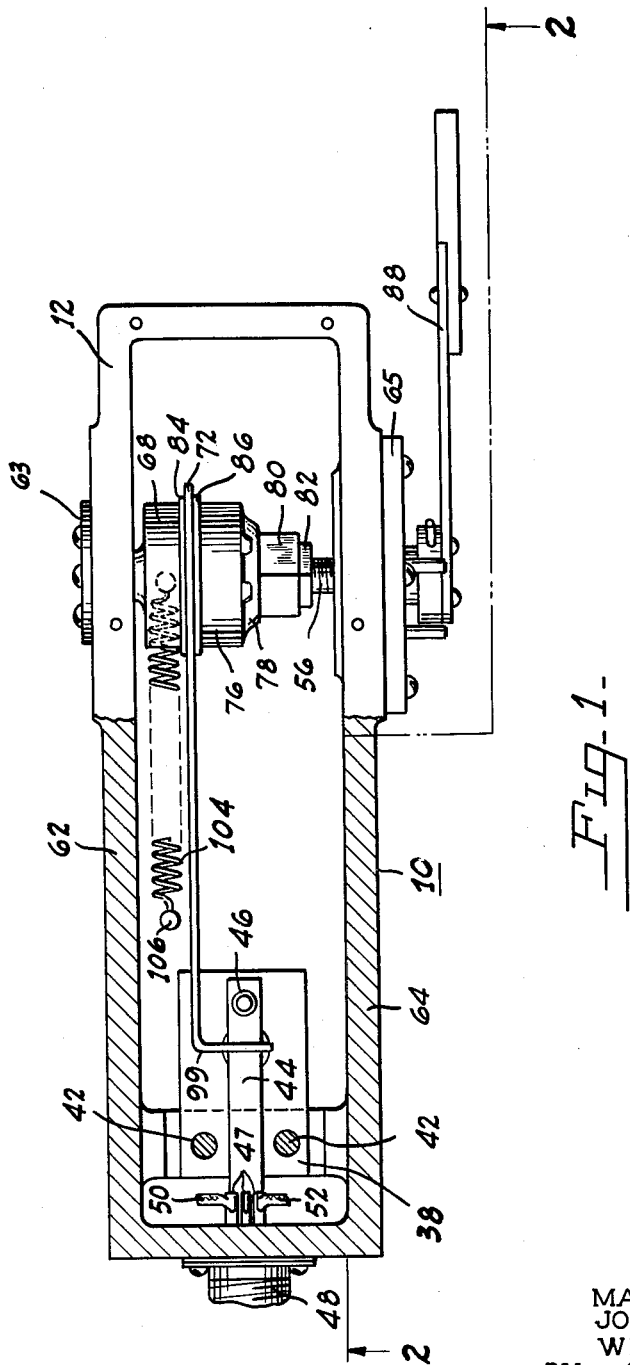
INVENTORS
MASON DECAMILLIS
JOHN J. HOEHN &
WILLIAM E. JOHNSON
BY
ATTORNEY

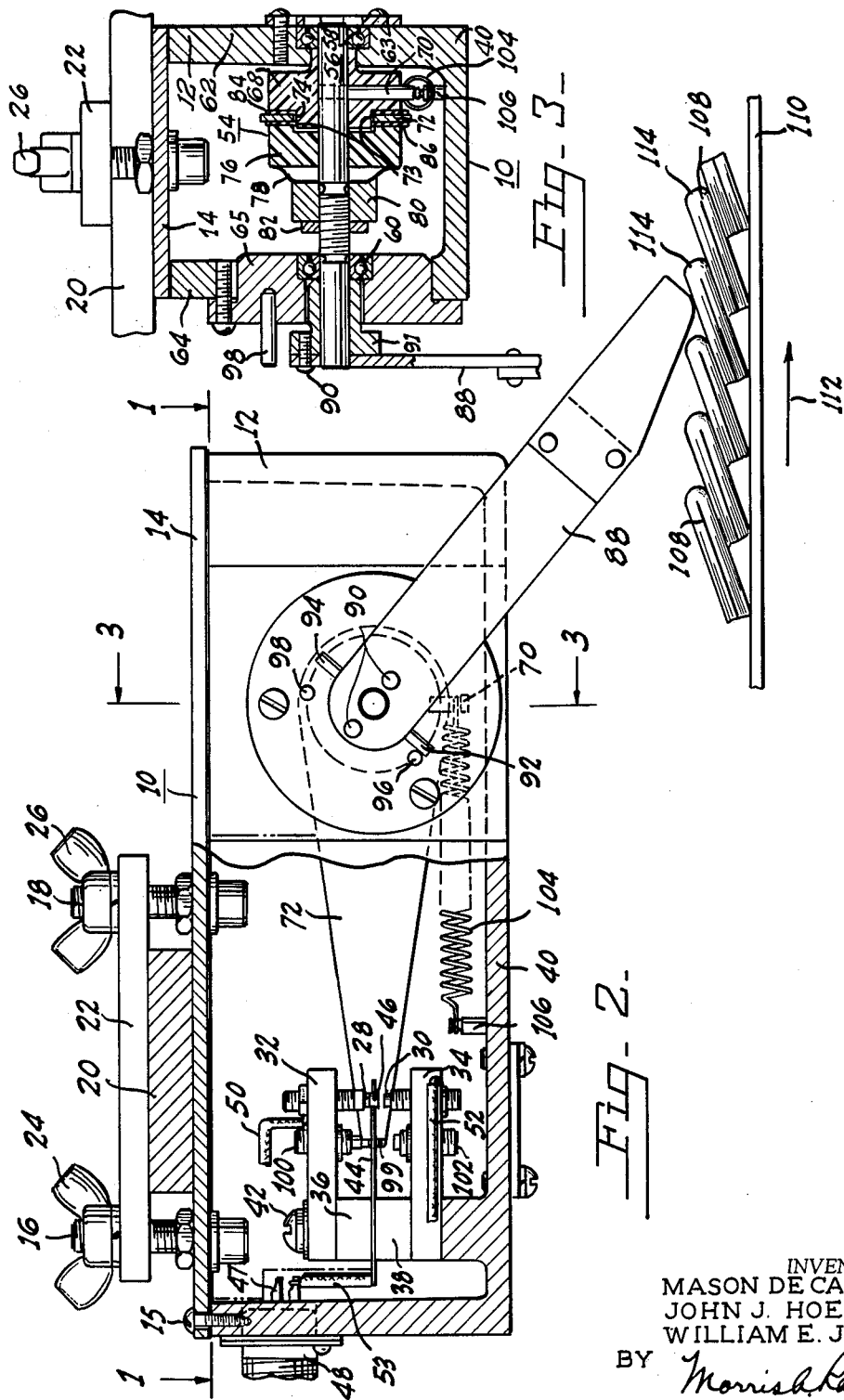

United States Patent Office 3,076,069
Patented Jan. 29, 1963

3,076,069
COMBINED SENSING AND SWITCHING DEVICE
Mason De Camillis, Dearborn, Mich., John J. Hoehn, Merchantville, N.J., and William E. Johnson, Farmington, Mich., assignors to Radio Corporation of America, a corporation of Delaware
Filed Apr. 4, 1960, Ser. No. 19,933
2 Claims. (Cl. 200—61.41)

This invention relates generally to devices for sensing changes in the countours of objects, and more particularly to a novel combined sensing and switching device wherein the linear displacement of a movable contact necessary to actuate the switching means is relatively short, and wherein the linear displacement of the sensing means may be relatively much longer. The device of the present invention is particularly useful for sensing each of the folded edges of a series of overlapping newspapers on a conveyor belt for counting purposes.

It is necessary for operators of a newspaper plant to know the number of newspapers being printed. In most modern plants, the completed newspapers are deposited on a conveyor belt in a continuous stream of overlapping newspapers with their folded edges exposed. It has been proposed heretofore to count these newspapers by sensing their projecting, folded edges. However, unless a sensing and switching device is free from contact bounce in the switching means and is capable of continuous overdriving of the sensing means, such a device is not practical for counting large quantities of newspapers at an extremely high rate of speed. Since it is not uncommon for some newspaper plants to print over a million newspapers a day, any sensing and switching device adapted to count these newspapers accurately, regardless of the thickness of each newspaper, should provide, with the aid of suitable circuitry, a discrete electrical signal for each newspaper that is sensed.

Accordingly, it is an object of the present invention to provide an improved combined sensing and switching device that is adapted to sense the folded edges of newspapers on a conveyor belt and to provide fast and accurate switching of the type suitable for counting purposes.

Another object of the present invention is to provide an improved combined sensing and switching device as aforesaid which will readily accommodate itself to newspapers or the like of different thicknesses.

Still another object of the present invention is to provide an improved device for the aforementioned purpose that will respond to various articles, such as newspapers, of varying thicknesses without requiring any critical adjustments.

A further object of the present invention is to provide an improved device as set forth that is relatively simple in construction and operation, easy to manufacture, and highly efficient in use.

In accordance with the present invention, the improved sensing and switching device comprises a single pole, double throw switch in a novel cooperative arrangement with a slip clutch of improved construction. The switching means of the device comprise a pair of spaced-apart fixed contacts. A contact arm supports, at one end thereof, a movable contact between the fixed contacts. The other end of the contact arm is fixed at a relatively short distance from the fixed contacts. The sensing means of the device comprise a shaft mounted for rotation on its axis and a sensing arm connected to one end of the shaft to rotate the shaft when the sensing arm is acted upon by an external force. The slip clutch comprises a driving member of a plastic material and a driven member in the form of a clutch arm. The clutch arm is mounted, adjacent one end thereof, for rotation about the shaft. Spring means about the shaft urge the driving and driven members into frictional engagement with each other so that the clutch arm rotates when the shaft is turned. The other end of the clutch arm, that is, the free end, is bifurcated and is disposed to embrace a portion of the contact arm in a manner to move the movable contact when the sensing arm is acted upon by an external force. A separate stop is disposed on each side of the bifurcated end of the clutch arm to limit its motion and to cause the clutch to slip in the event of any overtravel of the sensing arm.

The novel features of the present invention, both as to its organization and method of operation, as well as additional objects and advantages thereof, will be more readily understood from the foregoing description when read in connection with the accompanying drawings in which:

FIG. 1 is a cross-sectional view, taken along the line 1—1 of FIG. 2, showing one form of a combined sensing and switching device according to the present invention;

FIG. 2 is a cross-sectional view, taken along the line 2—2 of FIG. 1, and showing particularly the switching means of the device; and FIG. 3 is a cross-sectional view, taken along the line 3—3 of FIG. 2, and showing particularly the clutch structure of the device.

Referring, now, more particularly to the drawings, there is shown a combined sensing and switching device 10. The device 10 comprises a casing 12 of generally parallelepiped form and provided with a top cover 14. The top cover 14 is secured to the integral portion of the casing 12 by screws 15. A pair of studs 16 and 18 are secured to the cover 14, by any suitable means, to provide means for securing the device 10 to a supporting member 20. The device 10 may be secured to the member 20 by disposing the member 20 between the cover 14 and a bar 22. The bar 22 is formed with aligned holes that fit over the studs 16 and 18. The bar 22 is clamped against the member 20 by means of wing nuts 24 and 26, the latter being in threaded engagement with the studs 16 and 18, respectively.

The device 10 comprises switching means including a pair of fixed contacts 28 and 30. The fixed contacts 28 and 30 are opposed to each other in linear alignment and threadedly engaged in insulating blocks 32 and 34, respectively. The blocks 32 and 34 are maintained substantially parallel to each other and in a spaced-apart position by means of insulating blocks 36 and 38. The blocks 32, 34, 36 and 38 are fastened to the bottom wall 40 of the device 10 by means of a pair of screws 42 passing through aligned holes in these blocks.

A contact arm 44 has one end thereof anchored between the blocks 36 and 38. The other end of the contact arm 44 comprises a movable contact 46 disposed between the fixed contacts 28 and 30. It will now be understood that the fixed contacts 28 and 30 and the movable contact 46 comprise a single pole, double throw switch of which the movable contact 46 may make electrical contact with either the fixed contact 28 or the fixed contact 30. Each of the fixed contacts 28 and 30 and the movable contact 46 is electrically connected to a separate terminal 47 of a plug 48 by means of wires 50, 52, and 53, respectively. It will now be understood that the single pole, double throw switch comprising the fixed contacts 28 and 30 and the movable contact 46 may be connected in any desired circuit, such as a counting circuit (not shown), by means of connections to the plug 48.

Means are provided to move the movable contact 46 over the relatively short path of travel between the fixed contacts 28 and 30. To this end, a clutch 54 is disposed about a shaft 56. The shaft 56 is fixed in a parallel relationship to the lower wall 40 of the casing 12. Opposite ends of the shaft 56 are supported by bearings 58 and 60, respectively retained in the opposite, vertical, side walls 62 and 64 of the casing 12. The bearing 58 is fixed to the side wall 62 by means of a retaining ring 63 screwed to the wall 62. The side wall 64 is formed with a detachable disc 65 for ease of assembly of the clutch 54.

The clutch 54 comprises a driving member 68 fixed to the shaft 56 by means of a pin 70. The pin 70 passes through a hole in the driving member 68 and an aligned hole in the shaft 56. The driving member 68 may comprise a plastic material, such as "Nylon" or "Teflon," trademarks of E. I. du Pont de Nemours & Co.

The driven member of the clutch 54 comprises a clutch arm 72. One end of the clutch arm 72 is formed with an opening 74 (FIG. 3) through which an annular shoulder 73 of the driving member 68 extends. The clutch arm 72 is mounted relatively loosely on the annular shoulder 73 for ready rotation about the shaft 56.

Spring means are disposed around the shaft 56 to urge the driving member 68 toward the driven member 72. To this end, an annular member 76 of a plastic material is mounted loosely about the shaft 56 and urged in a direction toward the clutch arm 72 by means of a spider spring 78 and nut 80, the latter being in threaded engagement with a portion of the shaft 56. The annular member 76 may comprise a synthetic plastic material, such as a polyamide resin or a tetrafluoroethylene polymer, sold under the trademarks of "Nylon" or "Teflon" by the E. I. du Pont Co. A lock nut 82 is also in threaded engagement with a portion of the shaft 56 for the purpose of locking the nut 80 in any desired position on the shaft 56.

A washer 84 of plastic material, such as a tetrafluoroethylene polymer ("Teflon") is disposed between the driving member 68 and the driven member 72. A washer 86, similar to the washer 84, is disposed between the annular member 76 and the driven member 72. The portion of the driven member 72 about the shaft 56, that is, that portion of the clutch arm 72 that is in physical contact with the washers 84 and 86, should be a hardened metal, such as a tungsten carbide, or "Carboloy," a trademark of the General Electric Company. It will now be understood that, by urging the driven member 72 against the driving member 68 by means of the adjusting nuts 80 and 82 and the spring 78, the driving member 68 will drive the driven member 72 when the shaft 56 is rotated.

A sensing arm 88 is fixed to an end of the shaft 56 by any suitable means, such as rivets 90 and a collar 91. The sensing arm 88 extends at right angles to the shaft 56 and causes the shaft 56 to rotate when it is moved by an external force. A pair of diametrically opposed pins 92 and 94 extends radially from the end of the shaft 56 and co-operates with a pair of stop pins 96 and 98, respectively, for the purpose of limiting the rotation of the shaft 56 to a desired angular rotation.

The free end 99 of the driven member 72 of the clutch 54 is bent laterally 90° and bifurcated to receive the contact arm 44 between the bifurcated portions thereof. One of these bifurcated portions extends above the contact arm 44, and the other bifurcated portion extends below the contact arm 44, as best seen in FIG. 2. It will now be understood that any rotation of the clutch arm 72 will cause the arm 72 to move the contact arm 44, and thus to move the movable contact 46 toward one or the other of the contacts 28 or 30, depending upon the direction of rotation of the clutch arm 72 about the shaft 56. A stop 100 is screwed into the block 32, adjacent to the upper bifurcated portion of the clutch arm 72, to limit the clockwise rotation of the clutch arm 72, as viewed in FIG. 2. A stop 102 is screwed into the block 34 and extends to a point adjacent to the lower bifurcated portion of the clutch arm 72 to limit the counterclockwise rotation of the clutch arm 72. The portions of the stops 100 and 102 adjacent to the bifurcated portions of the clutch arm 72 may be rubber inserts to aid in reducing contact bounce.

A spring 104, connected between the free end of the pin 70 and a pin 106 secured in the lower wall 40 of the casing 12, urges the movable contact 46 into electrical engagement with the fixed contact 28 in the absence of an external force on the sensing arm 88.

The operation of the combined sensing and switching device 10, in accordance with the present invention, will be described in connection with the counting of newspapers 108 arranged in an overlapping, aligned relation on a conveyor belt 110, but not shown to true scale in FIG. 2 only for the sake of more clearly illustrating the operation. Let it be assumed that the conveyor belt 110 is moving in the direction indicated by the arrow 112 to carry the newspapers 108 away from the discharge end of a printing press. The device 10 is fixed so that the free end of the sensing arm 88 comes in contact with the newspapers 108. It will now be understood that, when the folded edge 114 of each newspaper 108 passes beneath the free end of the sensing arm 88, the shaft 56 will be rotated in a counterclockwise direction, as viewed in FIG. 2. This action rotates the driving member 68 of the clutch 54 which, in turn, drives the driven member 72. Thus, the clutch arm 72 is also rotated counterclockwise. This action also moves the movable contact 46 from the fixed contact 28 to the fixed contact 30. Any additional force in a counterclockwise direction on the sensing arm 88 causes the clutch 54 to slip.

The sensing arm 88 is caused to follow the constantly changing contour of the overlapped newspapers in response to the spring 104. Thus, immediately after a folded edge 114 of a newspaper 108 has passed beneath the free end of the sensing arm 88, the sensing arm 88 rotates in a clockwise direction (FIG. 2) by the action of the spring 104. A clockwise rotation of the sensing arm 88 also causes the shaft 56 and the driven member 72 of the clutch 54 to rotate in a clockwise direction. The movable contact 46 therefore moves from the fixed contact 30 back to the fixed contact 28. Again, any overdriving of the sensing arm 88 causes the clutch 54 to slip. Thus, it will be understood that the use of the clutch 54 permits a relatively large linear displacement of the free end of the sensing arm 88 for a relatively small linear displacement of the movable contact 46. Signals derived through the contacts 28 and 30 can be used to actuate one or more suitable counting devices (not shown). With the described arrangement, newspapers of varying thicknesses can be counted without making any critical adjustments for the thicknesses of the newspapers.

From the foregoing description, it will be apparent that there has been provided an improved sensing and switching device adapted to sense changes in the contour of one or more moving objects and to provide signaling means which may be used in determining the count or some other feature, such as critical thickness, for example, of such objects. While the device of the present invention has been described in connection with means for counting newspapers emerging from a newspaper press, it will be understood that the example used is merely illustrative and is not to be construed in a limiting sence. Since the device described and illustrated comprises a switch of the single pole, double throw type, each newspaper sensed causes the movable contact to touch the two fixed contacts successively for a single count. This type of action results in a more accurate switch for counting purposes.

The electrical circuits for counting have not been shown or described because they are known in the art, and they form no part of the instant invention. It will be understood, however, by those skilled in the art that, with the aid of suitable circuitry, two discrete signals, one from each fixed contact, may be obtained successively by the switching means of the present invention. Also, the use of a tetrafluoroethylene polymer in the driving member of the clutch and the use of tungsten carbide in the driven member of the clutch provide improved clutch means for increasing the useful life of the sensing and switching device.

What is claimed is:

1. In a combined sensing and switching device having a switch of the type wherein a movable contact is mounted on a resilient contact arm for movement between two fixed contacts, the combination of a shaft, means mounting said shaft for rotation on its axis, a clutch comprising a driving member fixed to said shaft for rotation therewith and a driven member comprising a clutch arm having one end mounted relatively loosely about said shaft for rotation thereabout, means for urging said driven member into frictional engagement with said driving member, the other end of said clutch arm being bifurcated and embracing said contact arm whereby to move said movable contact to one or the other of said two fixed contacts when said driven member is driven by said driving member, a sensing lever connected to said shaft for rotating said shaft when acted upon by an external force, a pair of stops, and means mounting said stops adjacent to said other end of said clutch arm to limit the rotation thereof and to cause said clutch to slip when said sensing lever is overdriven.

2. In combination, a switch comprising a pair of fixed contacts, a resilient contact arm, a movable contact fixed to one end of said contact arm, means to mount said fixed contacts in a spaced-apart relationship to each other and to fix the other end of said contact arm so that said movable contact may be moved from one of said fixed contacts to the other, a rotatable clutch having driving means and driven means, and a sensing arm connected to said driving means to rotate said driving means when said sensing arm is moved by an external force, said driven means comprising a clutch arm having one end of hardened metal adjacent to said driving means, the other end of said clutch arm being adjacent to said contact arm and being adapted to move said contact arm when said clutch arm is rotated, said one end of said clutch arm comprising tungsten carbide, and said driving means adapted to contact said one end of said clutch arm being a plastic material consisting of a synthetic resin polymer.

References Cited in the file of this patent
UNITED STATES PATENTS

| | | |
|---|---|---|
| 2,145,634 | Rook et al. | Jan. 31, 1939 |
| 2,186,765 | Metcalf | Jan. 9, 1940 |
| 2,802,914 | Karkow | Aug. 13, 1957 |
| 2,881,275 | Powell | Apr. 7, 1959 |